US 6,449,542 B1

(12) United States Patent
Böttiger et al.

(10) Patent No.: US 6,449,542 B1
(45) Date of Patent: Sep. 10, 2002

(54) METHOD FOR AUTOMATICALLY CONTROLLING THE LATERAL DYNAMICS OF A VEHICLE WITH FRONT-AXLE STEERING

(75) Inventors: Friedrich Böttiger, Esslingen; Avshalom Suissa, Renningen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/438,389

(22) Filed: Nov. 12, 1999

(30) Foreign Application Priority Data

Nov. 11, 1998 (DE) .......................... 198 51 978

(51) Int. Cl.$^7$ .......................... B62D 11/00; B62D 6/00; B63G 8/20
(52) U.S. Cl. .......................... 701/41; 701/72; 701/38; 701/39
(58) Field of Search .......................... 701/36, 37, 38, 701/39, 40, 70, 71, 77, 41, 78, 72

(56) References Cited

U.S. PATENT DOCUMENTS

| 5,079,708 A | * | 1/1992 | Brown .......................... 701/72 |
| 5,341,296 A | * | 8/1994 | Yasuno et al. .................. 701/70 |
| 5,557,520 A | * | 9/1996 | Suissa et al. .................. 701/29 |
| 5,576,959 A | * | 11/1996 | Hrovat et al. ................ 180/197 |
| 5,641,212 A | * | 6/1997 | Sakai .......................... 303/147 |
| 5,694,319 A | * | 12/1997 | Suissa et al. .................. 701/41 |
| 5,702,165 A | * | 12/1997 | Koibuchi ..................... 303/146 |
| 5,738,420 A | * | 4/1998 | Kawaguchi et al. ........ 303/146 |
| 5,832,399 A | * | 11/1998 | Seichter et al. ................ 701/51 |
| 5,882,092 A | * | 3/1999 | Koibuchi ..................... 303/146 |
| 6,035,251 A | * | 3/2000 | Hac et al. ...................... 701/70 |
| 6,092,882 A | * | 7/2000 | Matsuno ..................... 303/140 |

FOREIGN PATENT DOCUMENTS

| DE | 4 226 746 | 10/1993 |
| DE | 4 325 413 | 2/1995 |
| DE | 195 150 55 | 5/1996 |

* cited by examiner

Primary Examiner—Jacques H. Louis-Jacques
Assistant Examiner—Brian J. Broadhead
(74) Attorney, Agent, or Firm—Crowell & Moring LLP

(57) ABSTRACT

A method is provided for automatically controlling the lateral dynamics of a vehicle with front-axle steering by determining a first desired value for the vehicle yaw velocity, corresponding to the path movement of the vehicle set by the operation of a steering element or device, and a second desired value for the vehicle yaw velocity, corresponding to the sideslip angle in the area of the unsteered rear wheels of the vehicle, and supplying the smaller of the two yaw velocity values to an automatic control device as the desired input. Upon activation of the automatic control device, the vehicle no longer precisely follows the driver's wish as set by the steering element but rather, follows it only approximately by adjusting the sideslip angle in the area of the unsteered rear vehicle wheels to a value that is compatible with the dynamic of a non-swerving vehicle and thereby enlarging the slip angle at the steered front wheels of the vehicle.

10 Claims, 2 Drawing Sheets

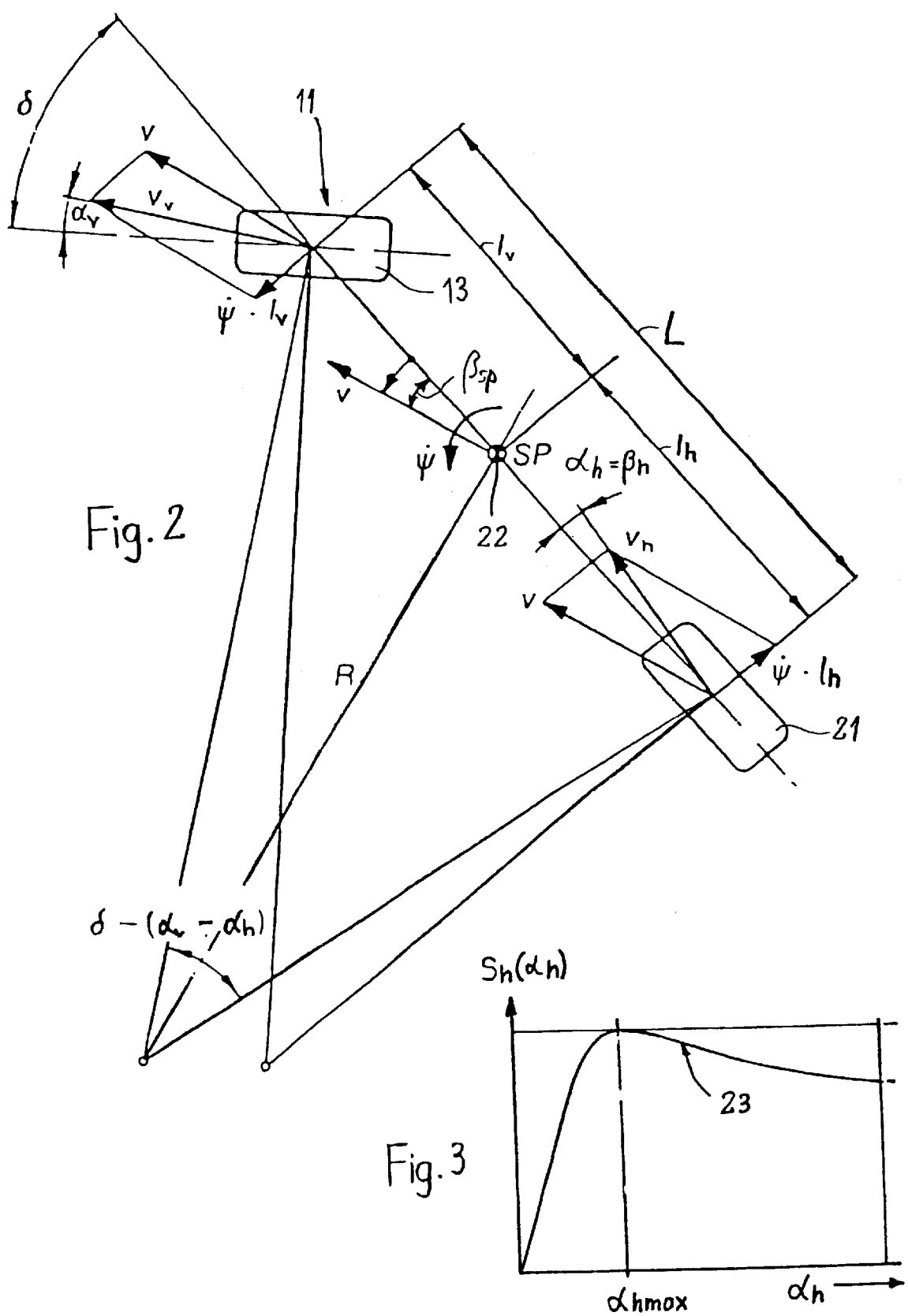

METHOD FOR AUTOMATICALLY CONTROLLING THE LATERAL DYNAMICS OF A VEHICLE WITH FRONT-AXLE STEERING

BACKGROUND OF THE INVENTION

The present invention relates to a method for automatically controlling the lateral dynamics of a vehicle with front-axle steering, and more particularly to control taking place as a function of deviations of measured actual values of the yaw velocity from continuously generated desired values of the yaw velocity, and the adjusting of the actual values by setting wheel steering angles ($\delta_i$) and/or setting wheel braking forces ($P_i$).

DE 42 26 746 describes a method in which the steering angles of the front wheels of the vehicle are determined as a function of the driving situation. This determination takes place while taking into account the yaw velocity $\dot\psi$ of the vehicle as well as the sideslip angle $\beta$. In addition to influencing of the lateral dynamics of the vehicle by the steering angle adjustment, a brake intervention can also take place at individual vehicle wheels. The yaw behavior of the vehicle as well as the sideslip angle are used for determining the wheel steering angle and/or braking power variables.

A disadvantage of the known method is that, because of a permanent limitation of the sideslip angle and, as a result, also of the slip angle in numerous driving situations, the maximal lateral control force of the rear wheels of the vehicle cannot be utilized and deviations of the path curve of the vehicle therefore occur from the desired curve corresponding to the driver's wish even if there is not yet any swerving tendency of the vehicle, and a limited drifting of the vehicle—a relatively large slip angle at the rear axle—could be permitted.

DE 43 25 413 A1 describes a method for determining the sideslip angle and influencing, as a function of this sideslip angle, the lateral dynamics of the vehicle by a steering and braking intervention. Thereby, a swerving of the vehicle can largely be avoided. It was found, however, that an automatic lateral dynamics control alone as a function of the sideslip angle is not sufficient in order to avoid a swerving of the vehicle in all statistically significant situations.

SUMMARY OF THE INVENTION

An object of the invention is, therefore, to provide a method which prevents a swerving of the vehicle with high reliability regardless of an extensive freedom with respect to the design of the vehicle reactions upon the setting of the driver's wish with respect to the course of the vehicle.

This object has been achieved by a method in which by way of a linear vehicle model, which represents a dynamic wish behavior, a first desired value $\dot\psi_{des}(\delta, v_x)$ is determined for the yaw velocity $\dot\psi$, which desired value corresponds to the driver's wish with respect to the path movement of the vehicle set by the operation of a steering element (steering wheel, joystick, or the like), in that, under the secondary condition, that the sideslip angle $\beta_h$ in the area of the unsteered rear wheels of the vehicle should not exceed a limited value, another desired value $\dot\psi_{des}(\beta)$ is determined, and in that the smaller of the two desired values with respect to the amount is used as the desired value of the yaw velocity relevant for the automatic control.

Accordingly, while processing quantities which represent the movement condition of the vehicle, particularly the steering angle $\delta$ defined by the driver and the vehicle longitudinal velocity $v_x$, by way of a linearized vehicle model, a first desired value $\dot\psi_{des}(\delta, v_x)$ for the yaw velocity $\dot\psi$ is determined.

This value corresponds to the driver's wish with respect to the path movement of the vehicle set by the operation of a steering element or device (e.g., a steering wheel, joystick, or the like).

Furthermore, under the secondary condition that the sideslip angle $\beta_h$ in the area of the unsteered rear wheels of the vehicle should not exceed a limited value, another desired value $\dot\psi_{des}(\beta_h; \alpha_h)$ is determined, and the respective smaller value of the two desired values is supplied to the $\dot\psi$-controller of the automatic control device as a desired value input. Thereby, the sideslip-angle-dependent or slip-angle-dependent automatic yaw velocity control does not become effective before a swerving tendency occurs at the vehicle which can be recognized by the fact that "non-physically" high actual values of the yaw velocity occur while the values of the lateral vehicle acceleration are simultaneously low.

In addition, i.e., as long as a swerving tendency does not exist, the automatic lateral dynamics control can take place by way of the $\dot\psi$—desired value output of the vehicle model with a characteristic which, in principle, is arbitrary and corresponds to a desired vehicle handling; for example, an "easily" oversteering or understeering or neutral vehicle handling.

In a currently preferred implementation of the method according to the present invention, an uncoupling of the sideslip dynamics at the rear axle from those at the front axle corresponds to a type of desired-value formation provided for the control mode of the control device which limits the sideslip angle, at least if the moment of inertia $J_z$ of the vehicle about its normal axis in a good approximation corresponds to the value $J_z = m \cdot l_v \cdot l_h$. A control mode is achieved which can be implemented in a particularly simple manner and prevents a swerving of the vehicle.

The sideslip and slip angle limit value, which must not be exceeded in the swerve-preventing control mode, can be defined as a fixed value and is then expediently selected corresponding to that value at which the highest possible lateral control force transmission capability of the vehicle rear wheels exists.

For taking into account particularly the road condition, it may also be expedient to determine the sideslip angle limit value from the estimated values $\hat v_x$ and $\hat \mu$ of the vehicle velocity and $v_x$ and of the adhesion coefficient $\mu$.

For determining the actual value of the sideslip angle $\beta_h$ required for the automatic control, estimated values $\hat v_y$ and $\hat v_x$ of the lateral vehicle velocity $v_y$ and of the longitudinal vehicle velocity $v_x$ are suitable, which can be obtained, for example, as outputs of a Kalman filter, as disclosed in DE 43 25 413 A1, as well as measured values of the vehicle yaw velocity.

BRIEF DESCRIPTION OF THE DRAWINGS

FIG. 2 is a single-track model representation of a vehicle for a simplifying explanation of its lateral dynamics behavior; and FIG. 3 is a diagram for the qualitative explanation of the desired-value definition for the sideslip angle limiting mode of the control device of FIG. 1.

DETAILED DESCRIPTION OF THE DRAWINGS

Figure 1:
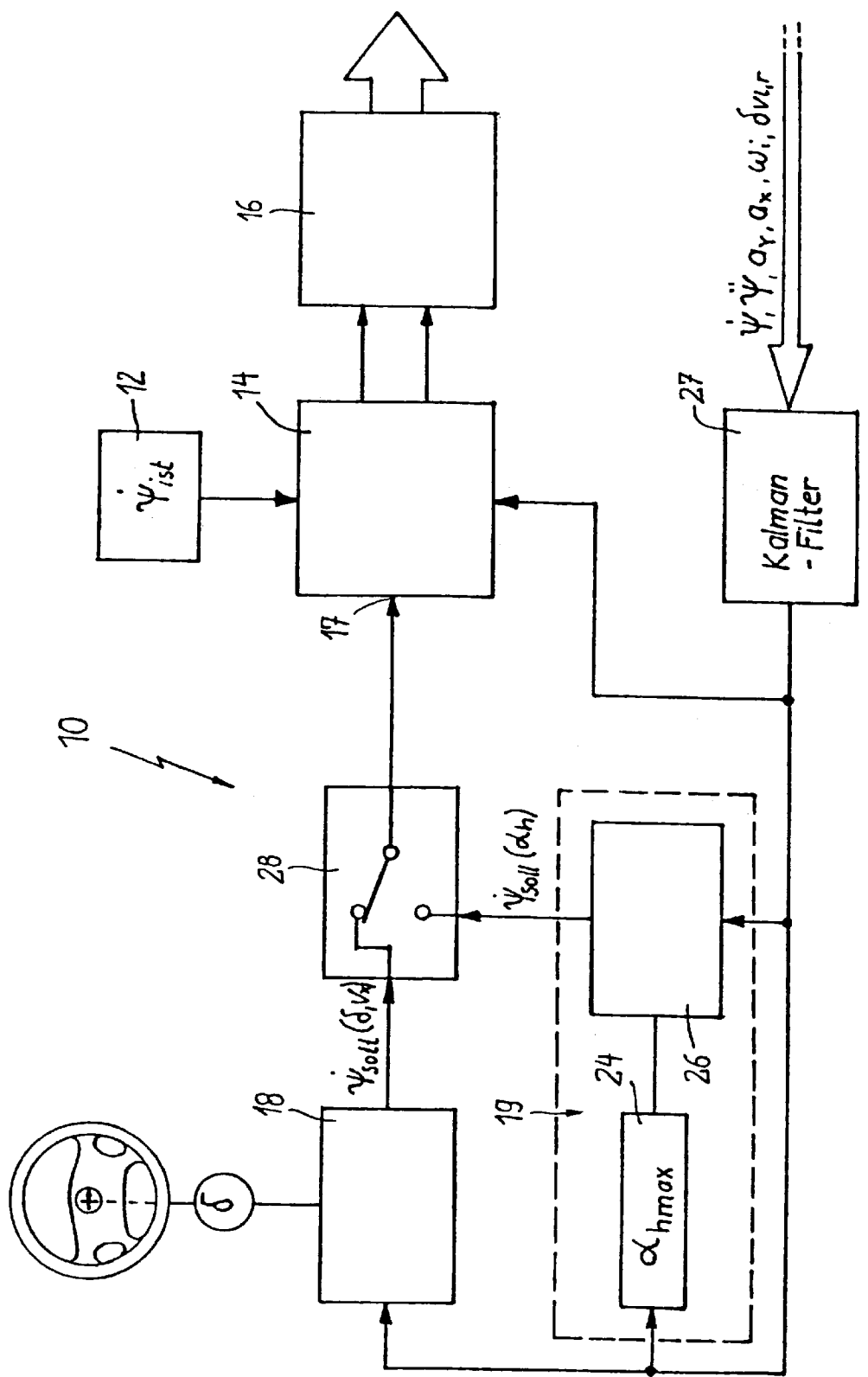
FIG. 1 is a schematic block diagram of a device for controlling the lateral dynamics of a road vehicle with front axle steering for implementing the method of the invention.

A yaw velocity ($\dot{\psi}$) control device, designated generally by reference numeral 10 in FIG. 1 is provided for a road vehicle 11 represented by a single-track model to avoid a swerving of the road vehicle during a cornering operation.

The automatic control device 10 is configured such that, as the result of an automatic control of the yaw velocity $\dot{\psi}$, which can be measured continuously by a yaw velocity sensor 12, a limitation can also be achieved of the slip angle $\alpha_h$, which, during a cornering operations, occurs at the unsteered vehicle wheels, to a value which is compatible with the dynamic stability of the vehicle 11.

In this type of automatic control, the dynamic stability, i.e., suppression of the swerving, of the vehicle has priority over a largest possible adaptation of the vehicle movement to the driver's wish. This means that, although when the control is active, the vehicle no longer "precisely" follows the driver's wish which is set by a steering element normally constructed as a steering wheel, but follows it only approximately. The vehicle remains, however, dynamically stable and can thus be controlled by the driver in the accustomed manner.

For the purpose of explanation, vehicle 11 is assumed to have a front axle steering system with the rear wheels of the vehicle being unsteered. It is further assumed that the vehicle 11 is equipped with an electrically controlled SbW (steer by wire) steering system. Electrically controllable steering angle actuating elements are thereby provided (not shown) which are individually assigned to or associated with the two steerable front wheels of the vehicle 11 which, in the single-track model of FIG. 2 are represented only by a front wheel 13. The steering angle actuating elements adjust, according to steering angle desired-value signals of a yaw velocity controller 14 of the control device 10, the required steering angles $\delta_{vl}$, $\delta_{vr}$ of the respective left and of the right front wheel of the vehicle 11 during cornering.

As the actuators of a lateral-dynamics control unit of the vehicle 11 which is designated generally by reference numeral 16 and by way of which the yaw velocity $\dot{\psi}$ of the vehicle 11 is adjusted, its wheel brakes are also utilized which, controlled by desired-value output signals of the $\dot{\psi}$ controller 14, can be activated individually or in a combined manner for developing defined wheel braking forces. Therefore, the wheel brakes can also be utilized for influencing the yaw behavior of the vehicle.

According to the driving situation, the adjustment of the yaw velocity $\dot{\psi}$ takes place either by activating the steering angle actuating elements alone or by a combined activation of the steering angle actuating elements and one or several of the wheel brakes of the vehicle. Under "extreme" conditions, the adjustment can also take place only by controlling at least one of the wheel brakes of the vehicle 11.

For generating $\dot{\psi}$ desired-value signals, which can be supplied to the desired-value signal input 17 of the $\dot{\psi}$ controller 14, a linear reference model 18 is provided and is implemented by an electronic computer. The model 18 can represent an arbitrary "wish" vehicle which, by way of the steering angle input representing the driver's wish and model-specific parameters resulting in a realistic transmission function, as well as estimated or measured values of the longitudinal vehicle velocity, determines desired values of the yaw velocity $\dot{\psi}_{des}$ ($\delta$, $v_x$). From comparisons with the measured value of the yaw velocity, the $\dot{\psi}$ controller 14 generates the control signals for the steering angle actuating elements and/or the brake actuators of the lateral-dynamics control unit 16.

The $\dot{\psi}$ control device 10 also comprises a sideslip angle ($\beta_h$) or slip angle ($\alpha_h$) controller which is designated generally by reference numeral 19. The controller 19 limits, in the event of a swerving tendency of the vehicle, the sideslip angle $\beta_h$ in the area of the rear unsteered vehicle wheels 21 to a value which is compatible with a dynamic stability in the sense of a non-swerving drive. Thereby, when the control device 10 operates in this mode, the limiting of the sideslip angle $\beta_h$ and of the slip angle $\alpha_h$ has priority over a change of the yaw velocity of the vehicle by enlarging the slip angle $\alpha_v$ at the steered front wheels 13 of the vehicle 11.

For explaining the concept of this sideslip controller 19, by way of the linearized single-track model shown in FIG. 2, the movement equations will be discussed first which describe the yaw behavior of the vehicle 11 and which are defined by the following differential equations:

$$J_z \cdot \ddot{\psi} = S_v \cdot l_v - l_h \cdot S_h \tag{1}$$

Equation (1) is the result of the demand for a balance of the torques about the normal axis 22 extending through the center of gravity (SP), as well as $$m \cdot \dot{v}_y = S_v + S_h - m \cdot v_x \cdot \dot{\psi} \tag{2}$$

which is the result of the demand for a balance of the lateral forces at the vehicle.

In the vehicle-fixed system of coordinates used as a prerequisite for the movement equations (1) and (2), in which system of coordinates "x" indicates the longitudinal direction of the vehicle and "y" indicates the lateral direction at a right angle thereto, the sideslip angle $\beta_{Sp}$ in the center of gravity of the vehicle is defined by the linearized relationship $$\beta_{SP} = v_y / v_x \tag{2a}$$

In a correspondingly linearized view, the following relationship applies to the sideslip angle $\beta_{sh}$ in a point behind the center of gravity, that is, a point which is situated between the center of gravity and the rear axle or on the other side of the latter and has the distance $l_{sh}$ from the center of gravity SP:

$$\beta_{sh} = -\frac{v_y}{v_x} + \frac{\dot{\psi} \cdot l_{sh}}{v_x} \tag{2b}$$

Accordingly the following relationship applies to the sideslip angle $\beta_h$ at the rear axle, where the sideslip angle according to the single-track model of FIG. 2 is equal to the slip angle $\alpha_h$.

$$\beta_h = -\frac{v_y}{v_x} + \frac{\dot{\psi} \cdot l_h}{v_x} \tag{2c}$$

wherein $l_h$ indicates the distance of the rear axle from the center of gravity of the vehicle.

As the result of the time-related differentiation of this relationship, the following relationship follows when the the longitudinal vehicle velocity $v_x$ is constant:

$$\dot{\beta}_h = -\frac{\dot{v}_y}{v_x} + \frac{\ddot{\psi} \cdot l_h}{v_x} \quad (3)$$

With $\dot{v}_y$ from equation (2) and $\ddot{\psi}$ from equation (1), the following relationship is obtained for the time variation $\dot{\beta}_h$ of the sideslip angle $\beta_h$ at the rear axle:

$$\dot{\beta}_h = S_v \left[ \frac{l_v}{v_x} \cdot \frac{l_h}{J_x} - \frac{1}{m \cdot v_x} \right] - S_h \left[ \frac{l_h^2}{v_x \cdot J_z} + \frac{1}{m \cdot v_x} \right] + \dot{\psi} \quad (4)$$

Under the condition that the moment of inertia $J_z$ of the vehicle 11 about its normal axis 22 meets the relationship $$J_z = m \cdot 1_v \cdot 1_b \quad (4a)$$

which, for example, in the case of passenger cars, is usually met in a very good approximation or can easily be met, from equation (4), the following relationship is obtained for the sideslip angle change $\dot{\beta}_h$:

$$\dot{\beta}_h = \dot{\psi} - \frac{S_h \cdot (l_v + l_b)}{l_v \cdot m \cdot v_x} = \dot{\psi} - \frac{S_h \cdot L}{l_v \cdot m \cdot v_x} \quad (5)$$

This relationship illustrates that for $$\dot{\psi} = \frac{S_h \cdot L}{l_v \cdot m \cdot v_x} \quad (5a)$$

the time variation $\dot{\beta}_h$ or $\dot{\alpha}_h$ of the sideslip angle $\beta_h$ at the rear wheels 21 and of the slip angle $\alpha_h$ identical therewith disappears ($\dot{\alpha}_h=0$). That is, the sideslip angle or the slip angle becomes constant.

This is utilized for a limitation control of the slip angle ah by controlling the yaw velocity $\dot{\psi}$ in such a manner that the sideslip angle controller 19 generates desired values $\dot{\psi}_{des}(\beta_h)$ for the yaw velocity ($\dot{\psi}$) control according to the automatic control statement:

$$\dot{\psi}_{soll}(\alpha_h) = \frac{L \cdot S_n(\alpha_h)}{l_v \cdot m \cdot v_x} - \lambda(\alpha_h - \alpha_{hsoll}) \quad (6)$$

which can be supplied to the desired-value input 17 of the $\dot{\psi}$ controller 14, wherein $\lambda$ is a freely selectable amplification factor.

The control system represented by the $\dot{\psi}$ control device 10 as a whole has a cascade structure with the yaw velocity $\dot{\psi}$ as the correcting variable, as the result of the controller statement according to equation (6), a linearizing of the lateral movement being achieved according to the relationship $$\dot{\alpha}_h = -\lambda(\alpha_h - \alpha_{soll}) \quad (7)$$

which is the direct result of a comparison of the equations (5) and (6) in the event that $\dot{\psi}=\dot{\psi}_{des}(\alpha_b)$.

The side forces occurring in the equations (1), (2), (4), (5) and (6) are defined in the linearized single-track model of the vehicle 11 by the equations:

$$S_v = \frac{l_h \cdot m \cdot a_y + J_z \cdot \ddot{\psi}}{l_v + l_h} \quad (8)$$

and $$S_h = \frac{l_v \cdot m \cdot a_y - J_z \cdot \ddot{\psi}}{l_v + l_h} \quad (9)$$

Lateral "tire" forces, which as a function of the slip angle $\alpha_{v,h}$ can be defined by a relationship in the form of $$S_{v,h} = c_{v,h} \cdot \alpha_{v,h} \quad (10)$$

correspond to the side forces according to equations (8) and (9), in which Equation (10) tire-characteristic slip resistances are indicated as $c_{v,h}$.

The course curve 23 of FIG. 3, which represents a typical form of the dependence of the side forces on the slip angle, shows directly that, as the result of its enlargement, an increase of the side forces is possible only to a maximal value $\alpha_{max}$ of the slip angle. Accordingly, the slip angle controller or sideslip angle controller 19 is configured such that the slip angle $\alpha_h$ cannot exceed a value $\alpha_{hlimit}$ and this value is selected as the desired value for the control according to Equation (6).

The value $\alpha_{hlimit}$ may be fixedly defined, for example, at a value about 10°, which corresponds approximately to the value $\alpha_{hmax}$. The value marks the upper limit of the slip angle, up to which, as a result of the enlargement of the steering angle or slip angle, an increase of the side forces is possible. Alternately, the value can be defined in a variable manner by a limit value generator 24 schematically illustrated in FIG. 1, whose output is supplied as a desired value input to a $\dot{\psi}_{des}(\alpha_h)$ generator 26 which generates the $\dot{\psi}_{des}$ value outputs for the $\dot{\psi}$ controller 14 which provide the slip angle control by way of the $\dot{\psi}$ control.

An expedient method of defining the limit value $\alpha_{hlimit}$ consists of the fact that this limit value is formed according to an equation $$\alpha_{hbegr} = a_{h\,max} \cdot \mu + \alpha_{h0} \quad (11)$$

wherein $a_{hmax}$ and $\alpha_{h0}$ are constant parameters, and $\mu$ indicates the adhesion coefficient used in the respective cornering situation. The adhesion coefficient can clearly vary as a function of the road condition and of the weather conditions. An expedient selection of the fixed parameters $a_{hmax}$, $\alpha_{h0}$ in relation to the upper limit value $\alpha_{hmax}$ of the slip angle consists of the fact that, if the ratio $\alpha_{hmax}/\alpha_{h0}$ has a value q (q<1), the value (q−1) $\alpha_{h0}$ is selected for the parameter $a_{max}$. Thereby in the case of a typical maximal amount of the adhesion coefficient $\mu$ about 1, the value $\alpha_{hmax}$ is defined as the desired value for the slip angle control.

The side force $S_h(\alpha_h)$ required for generating the $\dot{\psi}_{des}$ values according to the Equation (6) suitable for limiting the slip angle is determined according to the equation (9) from measured or estimated values of the lateral acceleration $a_y$ and of the yaw angle acceleration $\ddot{\psi}$. It is assumed that the vehicle mass m, the distance $l_v$ of the center of gravity SP from the front axle, the wheel base $L=l_v+l_h$ and the yaw moment of inertia $J_z$ are constant as vehicle-specific quantities.

The longitudinal vehicle velocity $v_x$ is determined from measured values of the rotational wheel speeds $\omega_i$ of the vehicle wheels as an estimated value.

The actual value $\alpha_h$ of the slip angle at the rear axle is determined according to the linearized equation $$\alpha_h = -\frac{v_y}{v_x} + \frac{\dot\psi \cdot l_h}{v_x} \qquad (11a)$$

by way of estimated values of the longitudinal vehicle velocity $v_x$ and of the lateral vehicle velocity $v_y$ as well as of the measured value $\dot\psi$ of the yaw velocity. An estimated value generator 27 which is suitable for this purpose and which, from a processing of measured values for the yaw velocity $\dot\psi$, the yaw acceleration $\ddot\psi$, the lateral vehicle acceleration $\alpha_y$, the longitudinal vehicle acceleration $\alpha_x$, the rotational wheel speeds $\omega_i$ and the front wheel steering angles $\delta_v$, generates the estimated values $\hat v_x$, $\hat v_y$ to be processed by the $\dot\psi$ controller 14 and by the $\alpha_h$ controller 26, as well as an estimated value $\hat\mu$ for the adhesion coefficient. These values are supplied as inputs to the limit value generator 24, and optionally generate an $a_y$ output for the $\alpha_h$ controller. The generator 27 can be constructed in the manner of a Kalman filter, as described in detail, for example, in DE 43 25 413 A1, which is incorporated by reference herein for a way of determining the sideslip angle of a vehicle.

Estimated values $\hat\mu$ of the adhesion coefficient can be determined in that the amounts of the side forces according to Equations (8) and (9) are divided by the respective existing normal forces $F_z$ at the front axle and the rear axle, which, in turn, can be estimated from the vehicle weight and the axle or wheel load distribution. An estimated value $\hat v_y$ of the lateral velocity can be obtained by an integration of the lateral acceleration $a_y$ for the time period $\Delta t$, which elapses when a cornering is set until the lateral acceleration $a_y$ has become constant.

The control mode, under extreme conditions, can result in a significant deviation of the vehicle moving path from the driver's wish, so that the control mode provided for limiting the slip angle $\alpha_h$ by a limiting of the yaw velocity $\dot\psi$, becomes effective only if there is a swerving tendency of the vehicle, the automatic control concept implemented by the automatic control device 10 provides that the above-mentioned control mode is selected only if the $\dot\psi_{des}(\alpha_h)$ value caused by the slip angle control according to Equation (5) is smaller than the $\dot\psi(\delta, v_x)$ value supplied by the vehicle reference model 18. This supplied value is defined as a function of the steering angle $\delta$ and of the estimated value $\hat V_x$ of the longitudinal vehicle velocity as variable quantities.

Accordingly, a switch-over device 28 is provided which supplies the desired value outputs of the vehicle reference model 18 and those of the $\alpha_h$ controller 19 corresponding to the above-mentioned switch-over strategy (that the smaller one of the two desired values with respect to the amount is to be relevant to the $\dot\psi$ control) alternately to the desired-value input 17 of the $\dot\psi$ controller 14.

As a result, the vehicle density is desirably steered in the predominant number of statistically significant cornering situations to great advantage essentially by the steering intervention and thus acts largely corresponding to the driver's wish, and the slip angle or sideslip angle limiting control, which results in a deviation of the moving path of the vehicle from the driver's wish, becomes effective only in the extreme "dangerous" required situations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically controlling lateral dynamics of a vehicle with front-axle steering, comprising
   (a) obtaining deviations of measured actual values of yaw velocity from continuously generated desired values of the yaw velocity to perform the automatic controlling in dependence upon the deviations,
   (b) adjusting the measured actual values by setting at least one of wheel steering angles ($\delta_i$) and wheel braking forces ($P_i$),
   (c) determining, with a linear vehicle model which represents a dynamic wish behavior, a first desired value $\dot\psi_{des}(\delta, v_x)$ for the yaw velocity $\dot\psi$, which desired value corresponds a driver's wish with respect to the path movement of the vehicle set by the operation of a steering element,
   (d) determining an additional desired value $\dot\psi_{des}(\beta_h)$ or $\dot\psi_{des}(\alpha_h)$ in dependence on a sideslip angle limit value $\beta_{hmax}$ or a slip angle limit value $\alpha_{hmax}$, taking a secondary condition into consideration, the secondary condition being that the sideslip angle $\beta_h$, in an area of the unsteered rear wheels of the vehicle, or the slip angle $\alpha_h$ of the unsteered rear wheels should not exceed a limited value, and
   (e) using a smaller of the determined desired values as the desired value of the yaw velocity for the automatic control.

2. The method according to claim 1, wherein the additional desired value $\dot\psi_{des}(\beta)$ is defined by the equation $$\dot\psi_{des}(\beta) = \frac{K \cdot a_{ysh}}{v_x} - \lambda \cdot (\beta_{sh} - \beta_{shmax})$$

in which $\beta_{sh}$ is the sideslip angle in a point situated at a significant distance from a center of gravity in a vehicle rear area, $a_{ysn}$ is the lateral acceleration in the point, K is a vehicle specific constant, and $\lambda$ is a selectable amplification factor.

3. The method according to claim 1, wherein a yaw moment of inertia $J_z$ is defined at least approximately by the equation $$J_z = 1_h 1_v m$$

in which m is the vehicle mass, $l_v$ is the distance of a center of gravity of the vehicle from a front axle, and $1_h$ is the distance of a center of gravity from the rear axle and, the additional desired value required for the yaw velocity limit control is defined by the equation $$\dot\psi_{des}(\alpha_h) = \frac{L \cdot S_h(\alpha_h)}{l_v \cdot V_x \cdot m} - \lambda \cdot (\alpha_h - \alpha_{hmax})$$

wherein L is the wheel base of the vehicle and $S_h(\alpha_h)$ is the side force occurring at the rear axle of the vehicle when cornering.

4. The method according to claim 1, wherein the sideslip angle limit value $\beta_{hmax}$ or the slip angle limit value $\alpha_{hmax}$ is fixedly defined.

5. The method according to claim 4, wherein $\beta_{hmax}$ or $\alpha_{max}$ is approximately 10°.

6. The method according to claim 4, wherein the additional desired value $\dot\psi_{des}(\beta)$ is defined by the equation $$\dot{\psi}_{des}(\beta) = \frac{K \cdot a_{ysh}}{v_x} - \lambda \cdot (\beta_{sh} - \beta_{shmax})$$

in which $\beta_{sh}$ is the sideslip angle in a point situated at a significant distance from a center of gravity in a vehicle rear area, $a_{ysn}$ is the lateral acceleration in the point, K is a vehicle specific constant, and $\lambda$ is a selectable amplification factor.

7. The method according to claim 4, wherein when the yaw moment of inertia $J_z$ is defined at least approximately by the equation $$J_z = 1_h l_v\, m$$

in which m is the vehicle mass, $l_v$ is the distance of a center of gravity of the vehicle from a front axle, and $l_h$ is the distance of a center of gravity from the rear axle, the additional desired value required for the yaw velocity limit control, is defined by the equation $$\dot{\psi}_{des}(\alpha_h) = \frac{L \cdot S_h(\alpha_h)}{l_v \cdot V_x \cdot m} - \lambda \cdot (\alpha_h - \alpha_{hmax})$$

wherein L is the wheel base of the vehicle and $S_h(\alpha_h)$ is the side force occurring at the rear axle of the vehicle when cornering.

8. The method according to claim 1, wherein the sideslip angle limit value $\beta_{hmax}$ is determined taking into account estimated values $\hat{v}_x$ as well as $\hat{\mu}$ of the longitudinal vehicle velocity $v_x$ and of the adhesion coefficient $\mu$.

9. The method according to claim 1, wherein the actual value of the sideslip angle $\beta_h$ is determined from estimated values $\hat{v}_y$, v+e,cir +ee $_x$ of the lateral vehicle velocity ($v_y$) and of longitudinal vehicle velocity ($v_x$).

10. The method according to claim 9, wherein the additional desired value $\psi_{des}(\beta)$ is defined by the equation $$\dot{\psi}_{des}(\beta) = \frac{K \cdot a_{ysh}}{v_x} - \lambda \cdot (\beta_{sh} - \beta_{shmax})$$

in which $\beta_{sh}$ is the sideslip angle in a point situated at a significant distance from a center of gravity in a vehicle rear area, $a_{ysn}$ is the lateral acceleration in the point, K is a vehicle specific constant, and $\lambda$ is a selectable amplification factor.

\* \* \* \* \*